Feb. 26, 1924.
H. C. EGERTON
1,484,937
CUSHIONED VEHICLE TIRE, ETC
Filed Aug. 31, 1918
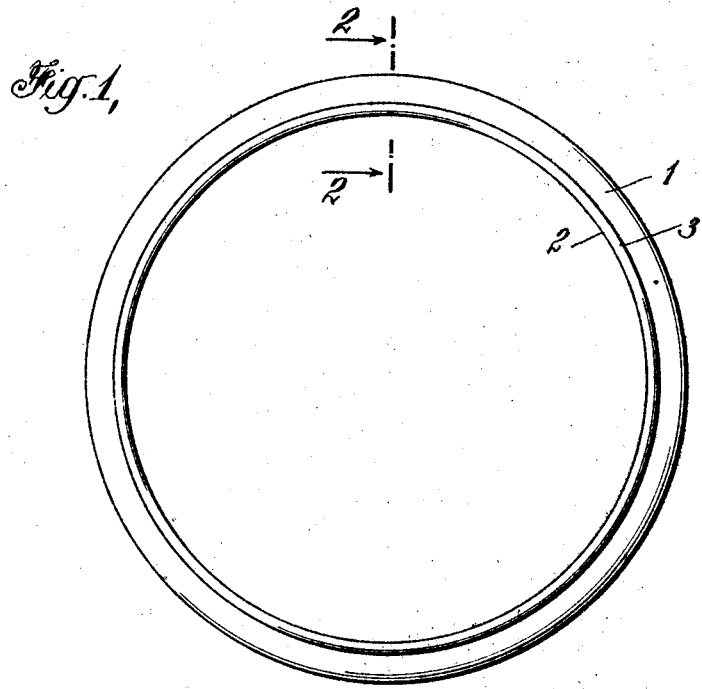
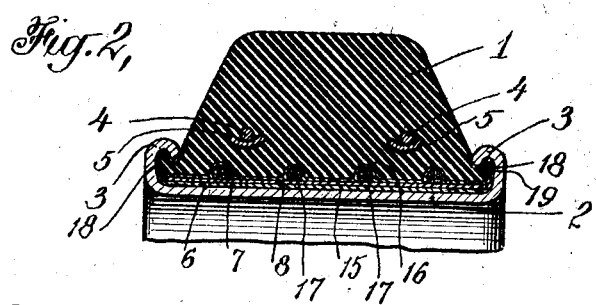
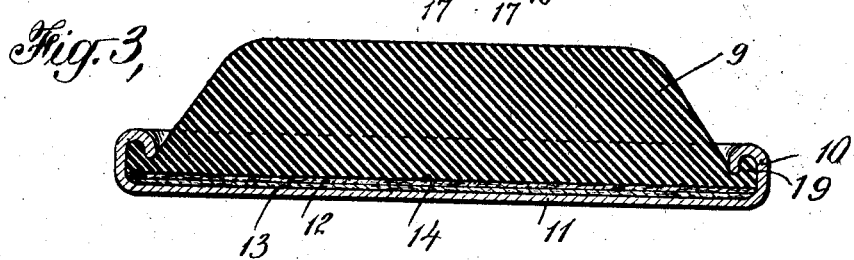
Inventor
Henry C Egerton
By his Attorney
Harry L Duncan Patented Feb. 26, 1924.

1,484,937

UNITED STATES PATENT OFFICE.

HENRY C. EGERTON, OF RIDGEWOOD, NEW JERSEY.

CUSHIONED VEHICLE TIRE, ETC.

Application filed August 31, 1918. Serial No. 252,170.

*To all whom it may concern:*

Be it known that I, HENRY C. EGERTON, a citizen of the United States, and resident of Ridgewood, county of Bergen, State of New Jersey, have made a certain new and useful Invention Relating to Cushioned Vehicle Tires, Etc., of which the following is a specification, taken in connection with the accompanying drawing, which forms part of the same.

This invention relates especially to vulcanized rubber cushioned vehicle tires and so forth in which the portions of the rubber tire cooperating with the rim portion of the wheel are secured to and strengthened and reenforced by a fabric connecting member impregnated with or carrying cured phenolic condensation cementing material. Where the tire of the solid or pneumatic type engages a lateral rim flange or retaining member, a rim bead protector layer or portion of such impregnated fabric is preferably provided and secured to this clincher or straight side rim bead portion of the tire. It is, for some purposes, desirable to mould a solid cushioned type vehicle tire directly into the metal rim with which it is used, and if desired the gripping engagement or connection between the base of the vulcanized rubber tire and the fabric connecting member may be increased by giving this connecting member a corrugated or increased area engaging surface in any suitable way, as for instance, by incorporating cords, ropes or other disconnected projections therein so that they are strongly secured thereto. In order to promote the union between the connector member and the tire it is, in many cases, desirable to provide a uniting member or strip of rubberized canvas or other fabric to serve as the rubber engaging member so as to facilitate the union of the rubber thereto which may be conveniently effected by moulding the rubber in place under pressure in a suitable mould in which it is vulcanized and the phenolic condensation cementing material simultaneously cured, if desired, so as to form a practically unitary structure which correspondingly minimizes creep and slipping between the parts under service conditions.

In the accompanying drawing showing in a somewhat diagrammatic way various illustrative embodiments of the invention—

Fig. 1 is a side view of a cushioned or solid type tire and rim.

Fig. 2 is an enlarged transverse section thereof taken substantially along the line 2—2 of Fig. 1 and Fig. 3 is a section through another form of cushion or buffer member.

As shown in Figs. 1 and 2 the rim 2 may be of heavy sheet metal construction and may of course be conveniently formed by welding up and shaping sheet steel of the usual character, rim flanges which may be of the clincher type being, if desired, provided at the sides as indicated by the numeral 3. The vulcanized rubber tire 1 may be of any suitable shape and construction and may be formed of rubber composition of the desired character for the particular service for which it is intended.

In order to facilitate and strengthen the connection between the tire and rim a connecting member of canvas or other fabric impregnated with or carrying phenolic condensation cementing material such as bakelite, condensite or redmanol varnish, for instance, may be interposed between the two and several strips or layers of heavy impregnated canvas such as 6, 7 may be wound on or tightly applied to the rim before the rubber composition is moulded in place thereon. It is sometimes advantageous to increase the contacting surface of the rubber and connecting member and especially to increase the gripping or interlocking engagement between these parts as by providing projecting portions or members on the connecting member so as to give a corrugated or other irregular surface thereto. For this purpose, cords or small woven cables or ropes 17 may be arranged at intervals along the connector member preferably after being coated or impregnated with such phenolic condensation cementing material so as to ensure their strong and effective union with the other layers of the connecting member when this cementing material is cured by the desired heat treatment. As indicated in Fig. 2 four such gripping cords are shown between the tire and connecting member and these cords may be separate annular cords or may be the different turns of a spirally wound cord or cable whose ends may of course be secured in place by any suitable devices. Although it is not in all cases necessary, it is sometimes desirable to provide a uniting member or layer of canvas or other fabric having a frictioned or other rubber coating on the surface of the connecting member with which the rubber directly engages. A strip or layer 15 of this character is shown as constituting the upper surface of the connecting member in Fig. 2 and as being folded or brought around the projecting gripping cords which is preferably done to some extent at least before the rubber composition of the tire is moulded and pressed into place. This uniting layer or member may be a single layer of heavy canvas preferably of rather open mesh which has been given a frictioned rubber coating on one side while the relatively uncoated side is pressed into engagement with the layers or portions of the connecting member beneath, which are sufficiently impregnated or supplied with phenolic condensation cementing material in relatively dried form so that under heat treatment this cementing material melts or flows into and engages the uniting layer sufficiently to securely unite it with the other layers of the connecting member.

If the connecting member has been built up on the rim in the case of such a cushioned tire and preferably dried, and in some cases at least partially cured by heat treatment thereon of such character as is suitable for the particular phenolic condensation cementing material employed, the rubber composition for the tire, which may be more or less previously formed of shaped strips or pieces, maybe put in place and the whole pressed in a forming and vulcanizing mould where it can be put under pressure and brought up to the desired heat of 250° to 320° F. more or less for a sufficient time to vulcanize the rubber while it is strongly forced into engagement with the connecting member to which it is vulcanized, at the same time that the phenolic condensation cemented material is cured and solidified by this heat treatment. In case securing wires such as 4 are used in the body of the tire, they may with advantage, be arranged on or outside of suitable supporting strips or members 5 comprising one or more layers of canvas or other fabric such as cloth or tough preferably open textured paper or the like which has been impregnated with bakelite varnish or other suitable phenolic condensation cementing material and substantially dried before being incorporated in the tire during the moulding thereof. The heat and pressure cure the cementing material in these supporting strips and also more or less vulcanize the rubber thereto, since the phenolic condensation cementing material seems to be somewhat more fluid than rubber under the lower vulcanizing heats so as to be somewhat displaced by the rubber in the engaging portions of the fabric. This action may also be used to directly and quite strongly unite the vulcanized rubber of the tire to the impregnated connecting member or canvas layers where no separate rubberized uniting member is interposed between them. The rim beads or lateral portions of a cushioned or other vehicle tire engaging the sides of the wheel rim or other lateral retaining devices may with advantage be strengthened and supported by one or more layers of such canvas or other fabric carrying or impregnated with phenolic condensation cementing material. As shown in Fig. 2 the rim bead 19 interlocking with the clincher rim flange 3 may have connected thereto on its outer surface a protector layer or portion 18 which may, for instance, be one or more of the foundation layers 6, 7 of the connector member; and the uniting member or layer 15 is preferably as indicated also more or less carried up around this protector layer or portion which strengthens this part of the tire and promotes its union to the protector layer.

Fig. 3 shows another form of cushion or buffer member, a series of which may be used on vehicle tires of the separate pad or tread member type or which may be used for cushion or buffer members in other connections. A rim member or support 11 of sheet metal may be formed with flanges 10 of the clincher type if desired and a connecting member is preferably interposed between the rubber and the base or inside of this rim or support, two layers 12, 13 being shown for this purpose. This connector member may be of heavy canvas preferably thoroughly impregnated with phenolic condensation cementing material and put in place in the supporting member before the rubber composition 9 is moulded thereto. If desired, rim beads of the clincher type 19 may be formed on the rubber buffer member which interlock with the clincher rim flanges to hold the rubber securely in place, in addition to the action of the connecting member which also contributes to hold the base of the rubber cushion member securely within its support and prevent localized creeping or displacement. Of course, in the event that any movement occurs between the connecting member and rim or support in any of these described constructions, the connecting member is much less injured or worn because of the increased strength and wearing properties secured by the incorporated cured phenolic condensation cementing material which may be present in the canvas or other fabric to the extent of 30 to 60% by weight more or less.

This invention has been described in connection with a number of illustrative embodiments, forms, proportions, elements, parts, shapes, materials, compositions, methods of preparation, production and use, to the details of which disclosure the invention is not of course to be limited, since what is claimed as new and what is desired to be secured by Letters Patent is set forth in the appended claims.

1. In rubber vehicle tires, a metal rim formed with integral lateral retaining flanges, a connecting member within said rim and in close contact therewith and comprising a number of layers of heavy canvas impregnated with and carrying cured phenolic condensation cementing material, a series of gripping surface increasing projecting cords carrying phenolic condensation cementing material securely uniting them to said connecting member, said connecting member comprising a uniting layer cemented to said cords and to the other layers of said connecting member by such phenolic condensation cementing material and provided with a previously applied frictioned rubber coating on its other surface, a solid type cushioned tire of vulcanized rubber composition moulded into said rim and vulcanized to the uniting layer of said connecting member and securely interlocked with said gripping projections, said tire being provided with rim beads having attached protector layers of fabric carrying cured phenolic condensation cementing material.

2. In rubber vehicle tires, a metal rim formed with integral lateral retaining flanges, a connecting member within said rim and in close contact therewith and comprising a number of layers of heavy canvas impregnated with and carrying cured phenolic condensation cementing material, a series of gripping surface increasing projections carrying phenolic condensation cementing material, said connecting member comprising a uniting layer cemented to said projections and to the other portions of said connecting member by such phenolic condensation cementing material, a solid type cushioned tire of vulcanized rubber composition moulded into said rim and vulcanized to the uniting layer of said connecting member and securely interlocked with said gripping projections.

3. In rubber vehicle tires, a connecting member adapted to fit within and in close contact with a wheel rim and comprising fabric carrying cured phenolic condensation cementing material, a series of gripping surface increasing projections carrying phenolic condensation cementing material securely uniting them to said connecting member, said connecting member comprising a fabric uniting layer cemented to said projections and to the other portions of said connecting member by such phenolic condensation cementing material, and a solid type tire of vulcanized rubber composition vulcanized to said connecting member and securely interlocked with said gripping projections.

4. In rubber vehicle tires, a connecting member adapted to fit within a wheel rim and comprising fabric carrying cured phenolic condensation cementing material, a series of gripping surface increasing projections carrying phenolic condensation cementing material securely uniting them to said connecting member, and a solid type tire of vulcanized rubber composition vulcanized to said connecting member.

5. In vehicle tires, a metallic support, a fabric connecting member engaging said support and impregnated with cured phenolic condensation cementing material, a vulcanized rubber tire tread cushioning member vulcanized to said connecting member and secured in said support, said connecting member being formed with projecting gripping cords secured to said connecting member and interlocking with said cushioning member.

6. In vehicle tires, a fabric connecting member impregnated with cured phenolic condensation cementing material, a vulcanized rubber tire tread cushioning member vulcanized to said connecting member, said connecting member being formed with projecting gripping portions.

7. In cushioning devices, a metallic support, a fabric connecting member engaging said support and carrying cured phenolic condensation cementing material, a vulcanized rubber cushioning member vulcanized to said connecting member and secured in said support, said connecting member being formed with projecting gripping portions interlocking with said cushioning member.

8. In cushioning devices, a fabric connecting member carrying cured phenolic condensation cementing material, a vulcanized rubber cushioning member vulcanized to said connecting member, said connecting member being formed with projecting portions increasing the area of contact between said cushioning member and said connecting member.

HENRY C. EGERTON.